(12) United States Patent
Oppenheimer et al.

(10) Patent No.: US 11,148,358 B2
(45) Date of Patent: Oct. 19, 2021

(54) METHODS AND SYSTEMS FOR VACUUM POWDER PLACEMENT IN ADDITIVE MANUFACTURING SYSTEMS

(71) Applicant: General Electric Company, Schenectady, NY (US)

(72) Inventors: Scott Michael Oppenheimer, Schenectady, NY (US); Anthony Joseph Vinciquerra, Rexford, NY (US); Laura Cerully Dial, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 754 days.

(21) Appl. No.: 15/860,423

(22) Filed: Jan. 2, 2018

(65) Prior Publication Data

US 2018/0186069 A1    Jul. 5, 2018

Related U.S. Application Data

(60) Provisional application No. 62/441,640, filed on Jan. 3, 2017.

(51) Int. Cl.
*B29C 64/153*        (2017.01)
*B33Y 10/00*         (2015.01)
(Continued)

(52) U.S. Cl.
CPC .......... *B29C 64/153* (2017.08); *B29C 64/205* (2017.08); *B29C 64/295* (2017.08);
(Continued)

(58) Field of Classification Search
CPC ... B29C 64/153; B29C 64/165; B29C 64/205; B29C 64/255; B29C 64/336; B29C 64/209; B29C 64/223
See application file for complete search history.

(56) References Cited

U.S. PATENT DOCUMENTS

| 5,883,357 A | 3/1999 | Newman et al. |
| 7,464,733 B2 | 12/2008 | Cox |

(Continued)

FOREIGN PATENT DOCUMENTS

| CN | 103978206 A | 8/2014 |
| CN | 103978206 B | 10/2015 |

(Continued)

OTHER PUBLICATIONS

International Search Report and Written Opinion, dated Oct. 15, 2018, for related International application No. PCT/US2018/012214.

(Continued)

*Primary Examiner* — Anthony Calandra
*Assistant Examiner* — Eric T Chen
(74) *Attorney, Agent, or Firm* — Dinsmore & Shohl LLP

(57) ABSTRACT

A method for fabricating a component of with an additive manufacturing system include entraining a first portion of first material particles in an airflow generated by a vacuum source and engaging the first portion of the first material particles against an air permeable screen. The first portion of the first material particles is deposited onto a build platform. The method also includes entraining a second portion of second material particles in the airflow and engaging the second portion of the second material particles against the air permeable screen. The second portion of the second material particles is deposited onto the build platform. An energy source transfers heat to at least a portion of at least one of the first portion of the first material particles or the second portion of the second material particles to facilitate consolidating material particles to fabricate the component.

11 Claims, 4 Drawing Sheets

(51) Int. Cl.
  *B33Y 30/00* (2015.01)
  *B29C 64/393* (2017.01)
  *B33Y 70/00* (2020.01)
  *B29C 64/295* (2017.01)
  *B33Y 50/02* (2015.01)
  *B29C 64/40* (2017.01)
  *B29C 64/205* (2017.01)
  *B33Y 40/00* (2020.01)
  *B29C 64/336* (2017.01)

(52) U.S. Cl.
  CPC .......... *B29C 64/336* (2017.08); *B29C 64/393* (2017.08); *B29C 64/40* (2017.08); *B33Y 10/00* (2014.12); *B33Y 30/00* (2014.12); *B33Y 40/00* (2014.12); *B33Y 50/02* (2014.12); *B33Y 70/00* (2014.12); *Y02P 10/25* (2015.11)

(56) References Cited

U.S. PATENT DOCUMENTS

| | | |
|---|---|---|
| 7,828,022 B2 | 11/2010 | Davidson et al. |
| 7,887,316 B2 | 2/2011 | Cox |
| 8,017,055 B2 | 9/2011 | Davidson et al. |
| 9,403,235 B2 | 8/2016 | Buller et al. |
| 2015/0314530 A1 | 11/2015 | Rogren |
| 2015/0352639 A1 | 12/2015 | Toyserkani et al. |
| 2017/0021452 A1* | 1/2017 | Tanaka .................. B33Y 10/00 |
| 2017/0165910 A1* | 6/2017 | Dinardo ................ B29C 64/153 |

FOREIGN PATENT DOCUMENTS

| | | |
|---|---|---|
| CN | 105050800 A | 11/2015 |
| DE | 19952998 A1 | 5/2001 |
| EP | 0431924 A2 | 6/1991 |
| JP | H0763914 A | 3/1995 |
| JP | 2002332461 A | 11/2002 |
| WO | 2004037902 A1 | 5/2004 |
| WO | 2015171182 A1 | 11/2015 |

OTHER PUBLICATIONS

T Wei et al., "Development of a Sheet-Based Material Handling System for Layered Manufacturing", Robotics and Automation, 2001. Proceedings 2001 ICRA. IEEE International Conference on, vol. 2, p. 1352-1357, May 21-26, 2001, Seoul, Korea.
Japanese Office Action for JP2019-556562 dated Sep. 7, 2020, pp. 1-2.
European Patent Office Search Report for EP 18736043.3 dated Sep. 3, 2020, pp. 1-8.
European Patent Office Search Report for EP 18736043.3 dated Sep. 9, 2020, pp. 1-8.

* cited by examiner

METHODS AND SYSTEMS FOR VACUUM POWDER PLACEMENT IN ADDITIVE MANUFACTURING SYSTEMS

CROSS REFERENCE TO RELATED APPLICATIONS

This application claims priority to U.S. provisional patent application Ser. No. 62/441,640, filed Jan. 3, 2017, which is hereby incorporated by reference in its entirety.

BACKGROUND

The subject matter disclosed herein relates generally to additive manufacturing systems and, more particularly, to additive manufacturing systems including a material delivery system for depositing material particles onto a build platform.

At least some additive manufacturing systems involve the consolidation of a powdered material to fabricate a component. Such systems produce geometrically complex components from powdered materials at a reduced cost and with improved manufacturing efficiency as compared to traditional manufacturing techniques. Some known additive manufacturing systems, such as Direct Metal Laser Melting (DMLM), Direct Metal Laser Sintering (DMLS), Selective Laser Sintering (SLS), Selective Laser Melting (SLM), and Electron Beam Melting (EBM) systems, fabricate components using a beam from an energy source and a powdered material, such as a powdered metal. In such additive manufacturing systems, the properties of the component are at least partially determined by the properties of the material used to form the component. In some instances, it is desirable to fabricate components that have variations and localized material properties. Accordingly, at least some components are formed from two or more separate components with different properties joined together. However, the joined components may have an increased cost of assembly and/or may have an increased risk of failure in comparison to a single component, due in part to the joint between the components.

BRIEF DESCRIPTION

In one aspect, a method of fabricating a component using an additive manufacturing system is provided. The method includes entraining a first portion of first material particles in an airflow generated by a vacuum source and engaging the first portion of the first material particles against an air permeable screen. In addition, the method includes depositing the first portion of the first material particles onto a build platform. The method also includes entraining a second portion of second material particles in the airflow and engaging the second portion of the second material particles against the air permeable screen. Furthermore, the method includes depositing the second portion of the second material particles onto the build platform. The method includes transferring heat to at least a portion of at least one of the first portion of the first material particles or the second portion of the second material particles with an energy source to facilitate consolidating the first portion of the first material particles and the second portion of the second material particles to fabricate the component.

In another aspect, an additive manufacturing system for fabricating a component is provided. The additive manufacturing system includes an energy source, a build platform configured to hold a plurality of first material particles and a plurality of second material particles, and a material delivery system. The material delivery system includes a dispenser assembly comprising a plurality of vacuum valves and an air permeable screen, and a vacuum source coupled in fluid communication to said plurality of vacuum valves. The additive manufacturing system also includes a controller configured to open a first subset of vacuum valves of the plurality of vacuum valves to generate an airflow through the first subset of vacuum valves and the air permeable screen to retrieve the plurality of first material particles. The controller is further configured to open a second subset of vacuum valves of the plurality of vacuum valves to generate an airflow through the second subset of vacuum valves and the air permeable screen to retrieve the plurality of second material particles. Moreover, the controller is configured to deposit the plurality of first material particles and the plurality of second material particles onto the build platform, and actuate the energy source to transfer heat to at least one of the plurality of first material particles and the plurality of second material particles based on a build parameter to facilitate consolidating the plurality of first material particles and the plurality of second material particles to fabricate said component.

In yet another aspect, a material delivery system for an additive manufacturing system is provided. The material delivery system includes a dispenser assembly comprising a plurality of vacuum valves and an air permeable screen. The material delivery system also includes a vacuum source coupled in fluid communication to the plurality of vacuum valves. Moreover, the material delivery system includes a mounting system coupled to the dispenser assembly.

DRAWINGS

These and other features, aspects, and advantages of the present disclosure will become better understood when the following detailed description is read with reference to the accompanying drawings in which like characters represent like parts throughout the drawings, wherein.

Figure 1:
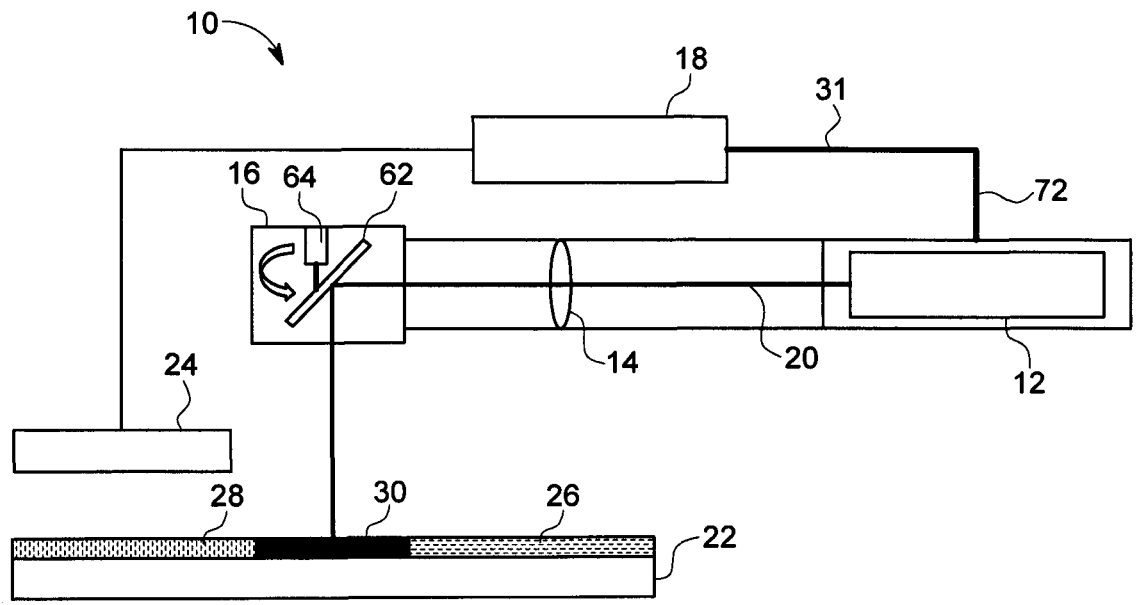
FIG. 1 is a schematic view of an exemplary additive manufacturing system.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, a field programmable gate array (FPGA), a programmable logic controller (PLC), and application specific integrated circuit, and other programmable circuits, and these terms are used interchangeably herein. In the embodiments described herein, memory may include, but it not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. In addition, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method of technology for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including without limitation, volatile and non-volatile media, and removable and non-removable media such as firmware, physical and virtual storage, CD-ROMS, DVDs, and any other digital source such as a network or the Internet, as well as yet to be developed digital means, with the sole exception being transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The systems and methods described herein relate to additive manufacturing systems, such as Direct Metal Laser Melting (DMLM) systems. The embodiments described herein include an energy source for emitting a focused energy beam and a material delivery system. The material delivery system retrieves a plurality of particles of a first material and deposits or places the particles on a build platform. In addition, the material delivery system retrieves a plurality of particles of a second material, different from the first material, and deposits the particles on the build platform, such that the particles of the first and second material define a layer of a component. The material delivery system includes a vacuum source coupled to a plurality of valves to apply a suction force to retrieve and deposit the particles of material. In one embodiment, the material delivery system retrieves and deposits particles of a sacrificial material, i.e., a material that is not part of the component, to provide support to the component during fabrication. Accordingly, the described embodiments facilitate providing the component with distinct, localized material properties.

FIG. 1 is a schematic view of an exemplary additive manufacturing system 10. In the exemplary embodiment, additive manufacturing system 10 is a direct metal laser melting (DMLM) system. While additive manufacturing system 10 is described herein as a DMLM system, it is noted that additive manufacturing system 10 can be any powder bed fusion process that enables additive manufacturing system 10 to fabricate a component using a focused energy device and at least one powdered material. For example, and without limitation, additive manufacturing system 10 can be a Direct Metal Laser Sintering (DMLS) system, a Selective Laser Sintering (SLS) system, a Selective Laser Melting (SLM) system, and an Electron Beam Melting (EBM) system.

Additive manufacturing system 10 includes an energy source 12 optically coupled to optics 14 and galvanometers 16 for controlling the scanning of energy source 12. In the exemplary embodiment, energy source 12 is a laser device, such as a neodymium-doped yttrium aluminum garnet (Nd:YAG) solid-state laser, that emits energy beam 20. In alternative embodiments, additive manufacturing system 10 includes any energy source 12 that enables additive manufacturing system 10 to function as described herein, such as one of a continuous, a modulated, a pulsed wave laser, or an electron beam generator. In addition, in some embodiments, additive manufacturing system 10 includes a diode fiber laser array that includes a plurality of diode lasers coupled to a plurality of optical fibers. In such embodiments, the diode fiber array simultaneously directs multiple laser beams from the optical fibers towards a surface or build platform to heat at least one powdered material. Alternatively or in addition, additive manufacturing system 10 may include more than one energy source. For example, without limitation, an alternative additive manufacturing system may have a first energy source having a first power output and a second energy source having a second power output different from the first power output, or an alternative additive manufacturing system may have at least two energy sources having substantially the same power output. However, additive manufacturing system 10 may include any combination of energy sources that permit additive manufacturing system 10 to function as described herein.

In the exemplary embodiment, additive manufacturing system 10 also includes a computer control system, or controller 18. Galvanometers 16 are controlled by controller 18 and deflect a beam 20 of energy source 12 along a predetermined path to form a melt pool. In one embodiment, the predetermined path is on a surface or build platform 22. In other embodiments, galvanometers 16 are deflect beam 20 along a predetermined path to facilitate sintering, or otherwise consolidating particles of material. Sintering is a term used to refer to producing three-dimensional (3D) components by using, for example, a laser beam to sinter or melt a powder material. More accurately, sintering entails fusing (agglomerating) particles of a powder material at a temperature below the melting point of the powder material, whereas melting entails fully melting particles of a powder material to form a solid mass. The physical processes associated with laser sintering or laser melting include heat transfer to a powder material and then either sintering or melting the powder material.

In the exemplary embodiment, galvanometers 16 included a mirror 62 operatively coupled to an actuator 64. Actuator 64 moves (specifically, rotates) mirror 62 in response to signals received from controller 18, and thereby deflect beam 20 towards and across selective portions of build platform 22. In some embodiments, mirror 62 includes a reflective coating that has a reflectance spectrum that corresponds to the wavelength of beam 20. In alternative embodiments, additive manufacturing system 10 includes any scanning device that enables additive manufacturing system 10 to function as described herein. For example, in some embodiments, galvanometers 16 includes two mirrors 62 and two actuators 64, each operatively coupled to one of mirrors 62. In other embodiments, galvanometers 16 includes, for example, and without limitation, two-dimension (2D) scan galvanometers, three-dimension (3D) scan galvanometers, dynamic focusing galvanometers, and/or any other galvanometer system used to deflect beam 20 of energy source 12. Additive manufacturing system 10 also includes a material delivery system 24 that delivers particles of material to build platform 22.

In the exemplary embodiment, build platform 22 supports at least a plurality of first material particles 26 and a plurality of second material particles 28 delivered by material delivery system 24. First material particles 26 and second material particles 28 are powdered build materials that are consolidated, i.e., heated and/or melted, and cooled and/or re-solidified, during the additive manufacturing process to fabricate a component 30. In particular, energy source 12 transfers heat to first material particles 26 and second material particles 28, e.g., generates a melt pool or sinters the materials, to facilitate consolidating the materials in component 30. In the exemplary embodiment, first material particles 26 and second material particles 28 include, for example, and without limitation, a gas-atomized alloy of one or more of cobalt, iron, aluminum, titanium, nickel, steel, and various combinations thereof. Alternatively, first material particles 26 and second material particles 28 include any material type that enables additive manufacturing system 10 to function as described herein, such as, for example, and without limitation, ceramic powders, metal powders made via non-gas atomization routes, metal-coated ceramic powders, thermoset resins, and thermoplastic resins. While described herein as utilizing first material particles 26 and second material particles 28 to fabricate component 30, it is noted that any number of materials may be used to fabricate a component, such as component 30.

In the exemplary embodiment, additive manufacturing system 10 is operated to fabricate component 30 by a layer-by-layer manufacturing process. Component 30 is fabricated from an electronic representation of the 3D geometry of component 30. The electronic representation may be produced in a computer aided design (CAD) or similar file. The CAD file of component 30 is converted into a layer-by-layer format that includes a plurality of build parameters 31 for each layer. In the exemplary embodiment, component 30 is arranged electronically in a desired orientation relative to the origin of the coordinate system used in additive manufacturing system 10. The geometry of component 30 is sliced into a stack of layers of a desired thickness, such that the geometry of each layer is an outline of the cross-section through component 30 at that particular layer location. A "toolpath" or "toolpaths" are generated across the geometry of a respective layer. Build parameters 31 are applied along the toolpath or toolpaths to fabricate that layer of component 30 from the material used to construct component 30. The steps are repeated for each respective layer of component 30 geometry. Once the process is completed, an electronic computer build file (or files) is generated including all of the layers. The build file is loaded into controller 18 of additive manufacturing system 10 to control the system during fabrication of each layer.

After the build file is loaded into controller 18, additive manufacturing system 10 is operated to generate component 30 by implementing the layer-by-layer manufacturing process, such as a direct metal laser melting method. The exemplary layer-by-layer additive manufacturing process does not use a pre-existing article as the precursor to the final component, rather the process produces component 30 from a raw material in a configurable form, such as a plurality of particles or a powder. For example, without limitation, a steel component can be additively manufactured using a steel powder. Additive manufacturing system 10 enables fabrication of components using a broad range of materials, for example, without limitation, metals, ceramics, and polymers.

Figure 2:
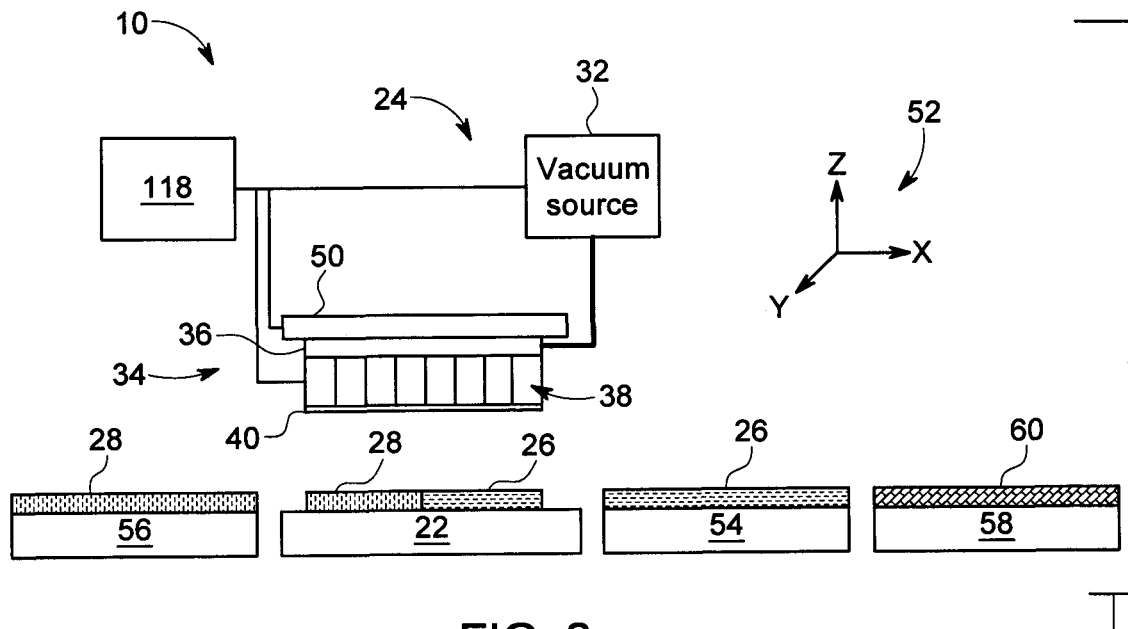
FIG. 2 is a schematic view of a portion of the additive manufacturing system shown in FIG. 1 including a material delivery system.
Figure 3:
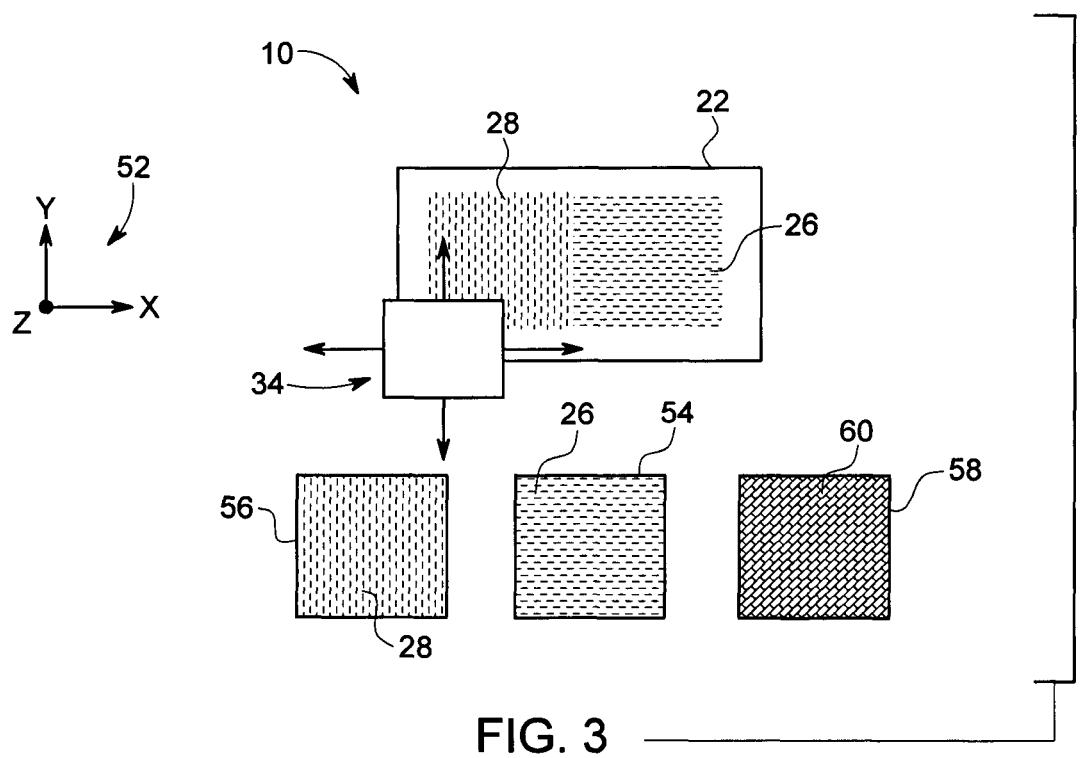
FIG. 3 is a schematic plan view of a portion of the additive manufacturing system shown in FIG. 1 including the material delivery system shown in FIG. 2.

FIG. 2 is a schematic view of a portion of additive manufacturing system 10 including material delivery system 24. FIG. 3 is a schematic plan view of a portion of additive manufacturing system 10 including material delivery system 24. In the exemplary embodiment, material delivery system 24 includes a vacuum source 32 coupled to a dispenser assembly 34, and a mounting system 50 coupled to dispenser assembly 34. Mounting system 50 is coupled in communication with controller 18, which translates or moves mounting system 50 in the X, Y, and Z axes, indicated generally at 52, to facilitate retrieving and depositing at least first material particles 26 and second material particles 28 for fabricating a layer of component 30 (shown in FIG. 1). Dispenser assembly 34 includes a vacuum manifold 36 and a plurality of individually controllable vacuum valves 38, arranged in an array, coupled to vacuum manifold 36. Dispenser assembly 34 also includes a gas or air permeable screen 40 (or membrane) coupled to the plurality of vacuum valves 38, opposite vacuum manifold 36. Screen 40 has a plurality of pores or openings sized to allow air to pass through screen 40, while substantially preventing first material particles 26 and second material particles 28 from passing through screen 40.

In the exemplary embodiment, material delivery system 24 also includes at least a first material supply source 54 and a second material supply source 56. Alternatively, material delivery system 24 includes any number of material sources required to build component 30. In the exemplary embodiment, first material supply source 54 and second material supply source 56 hold a quantity of first material particles 26 and second material particles 28, respectively. Dispenser assembly 34 retrieves portions of at least first material particles 26 and second material particles 28 from first material supply source 54 and second material supply source 56, respectively, and deposits the materials onto build platform 22. With reference to FIG. 3, as described herein, dispenser assembly 34 translates or moves relative to build platform 22. In particular, dispenser assembly 34 translates or moves laterally (i.e., in the X-Y plane) relative to build platform 22. In addition, dispenser assembly 34 translates or moves towards and away from build platform 22 (i.e., in the Z direction). As such, material delivery system 24 retrieves and deposits at least one of first material particles 26 and second material particles 28 in any desired pattern on build platform 22. In alternative embodiments, material delivery system 24 translates or moves in any manner that enables additive manufacturing system 10 to function as described herein.

In the exemplary embodiment, first material particles 26 and second material particles 28 are substantially level. In addition, second material particles 28 are deposited with substantially the same thickness as first material particles 26. Accordingly, screeding or leveling of first material particles 26 and second material particles 28 is not required. Omitting the screeding process of first material particles 26 and/or second material particles 28 facilitates reducing mixing of first material particles 26 and second material particles 28 that occurs during screeding. Alternatively, in some embodiments, first material particles 26 and/or second material particles 28 are screeded or leveled. For example, in some embodiments, first material particles 26 are screeded prior to deposition of second material particles 28. In other embodiments, first material particles 26 is at least partially fixed in position on build platform 22 to facilitate screeding of second material particles 28.

As shown in FIGS. 2 and 3, material delivery system 24 optionally includes a sacrificial material supply source 58 containing a quantity of sacrificial material particles 60. Dispenser assembly 34 retrieves portions of sacrificial material particles 60 from first sacrificial material supply source 58 and deposits sacrificial material particles 60 onto build platform 22. In particular, sacrificial material particles 60 are deposited in areas defined between first material particles 26 and second material particles 28 to function as a support material for component 30 during fabrication. In one embodiment, sacrificial material particles 60 are formed from a magnetic material and first material particles 26 and second material particles 28 are formed from non-magnetic materials. As such, after fabrication of component 30, a magnetic force is used to facilitate removing sacrificial material particles 60. In addition, in some embodiment, sacrificial material particles 60 are formed from a ceramic material and first material particles 26 and second material particles 28 are formed from metal materials. As such, sacrificial material particles 60 are not consolidated with first material particles 26 and second material particles 28 during fabrication of component 30.

Figure 4:
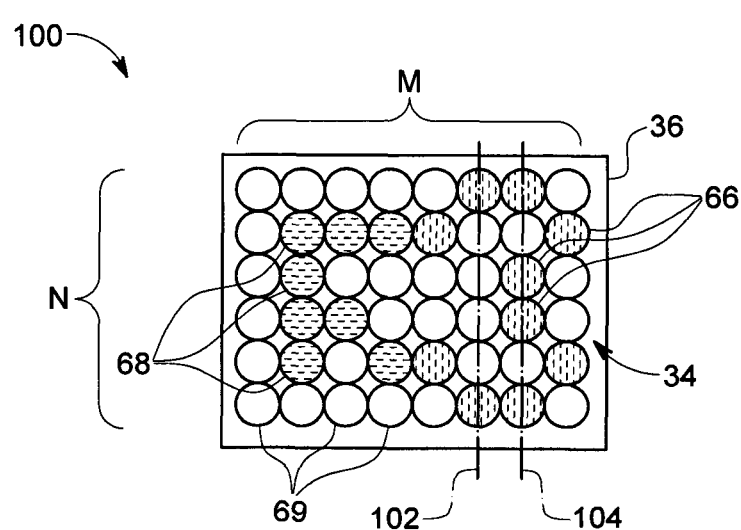
FIG. 4 is a schematic diagram of an array arrangement of individually controllable vacuum valves for use with a dispenser assembly of the material delivery system shown in FIG. 2.

FIG. 4 is a schematic diagram of an array arrangement 100 of individually controllable vacuum valves 38 for use with dispenser assembly 34 (shown in FIG. 3). In the exemplary embodiment, the plurality of vacuum valves 38 are arranged in M×N array arrangement 100, where M represent a number of columns of vacuum valves 38 and N represents a number of rows of vacuum valves 38. In the exemplary embodiment, array arrangement 100 includes six rows N and eight columns M. Alternatively, array arrangement 100 includes any number of columns and rows of vacuum valves 38 that enable additive manufacturing system 10 to function as described herein. For example, and without limitation, in one embodiment, array arrangement 100 of the plurality of vacuum valves 38 is arranged in a size and a shape to substantially correspond to a size and a shape of build platform 22. In the exemplary embodiment, rows N are arranged such that each succeeding row is aligned with the previous row, as indicated by centerlines 102 and 104. Alternatively, rows N are arranged in any desirable alignment with a succeeding row that enables additive manufacturing system 10 to function as described herein. For example, and without limitation, in one alternative embodiment, rows N are arranged such that each succeeding row is offset by one-half of a width of a respective vacuum valve 38 from the previous row.

With reference to FIGS. 2 and 4, in the exemplary embodiment, vacuum source 32 is coupled in fluid communication with vacuum manifold 36, and in turn, each vacuum valve 38. A first subset 66 of the plurality of vacuum valves 38 is actuated by controller 18 to selectively draw a partial vacuum through a respective vacuum valve 38 of the first subset 66 of vacuum valves 38, thereby generating airflow through the screen 40 and the respective vacuum valve 38. With dispenser assembly 34 positioned in first material supply source 54, a first portion of first material particles 26 is entrained in the airflow and is trapped or engaged against screen 40 at each respective vacuum valve 38 of first subset 66 of vacuum valves 38. In addition, a second subset 68 of the plurality of vacuum valves 38 is actuated by controller 18 to selectively draw a partial vacuum through a respective vacuum valve 38 of the second subset 68 of vacuum valves 38, thereby generating airflow through the screen 40 and the respective vacuum valve 38. With dispenser assembly 34 positioned in second material supply source 56, a second portion of second material particles 28 is entrained in the airflow and is trapped or engaged against screen 40 at each respective vacuum valve 38 of second subset 68 of vacuum valves 38. Optionally, in one embodiment, a third subset 69 of the plurality of vacuum valves 38 is actuated by controller 18 to selectively draw a partial vacuum through a respective vacuum valve 38 of the third subset 69, thereby generating an airflow through the screen 40 and the respective vacuum valve 38. With dispenser assembly 34 positioned in sacrificial material supply source 58, a third portion of sacrificial material particles 60 is entrained in the airflow and is trapped or engaged against screen 40 at each respective vacuum valve 38 of the third subset 69 of vacuum valves 38.

Figure 5:
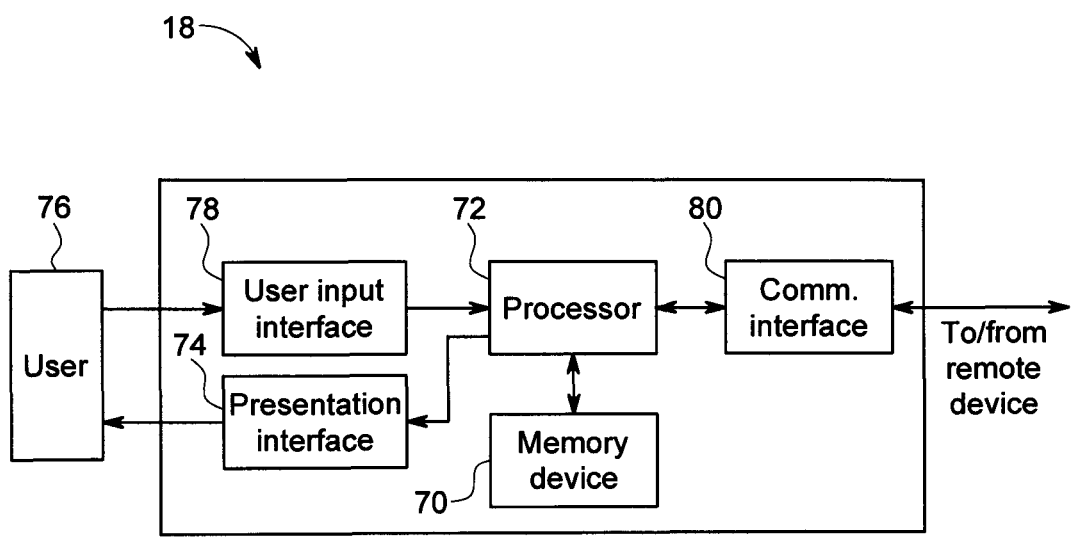
FIG. 5 is a block diagram of a controller for use with additive manufacturing system shown in FIG. 1.

FIG. 5 is a block diagram of controller 18 for use with additive manufacturing system 10 (shown in FIG. 1). In the exemplary embodiment, controller 18 is coupled to energy source 12, material delivery system 24, and mounting system 50. Controller 18 includes a memory device 70 and processor 72 coupled to memory device 70. In some embodiments, processor 72 includes one or more processing units, such as, without limitation, a multi-core configuration. In the exemplary embodiment, processor 72 includes a field programmable gate array (FPGA). Alternatively, processor 72 is any type of processor that permits controller 18 to operate as described herein. In some embodiments, executable instructions are stored in memory device 70. Controller 18 is configurable to perform one or more operations described herein by programming processor 72. For example, processor 72 is programmed by encoding an operation as one or more executable instructions and providing the executable instructions in memory device 70. In the exemplary embodiment, memory device 70 is one or more devices that enable storage and retrieval of information such as executable instructions or other data. In some embodiments, memory device 70 includes one or more computer readable media, such as, without limitation, random access memory (RAM), dynamic RAM, static RAM, a solid-state disk, a hard disk, read-only memory (ROM), erasable programmable ROM, electrically erasable programmable ROM, or non-volatile RAM memory. The above memory types are exemplary only, and are thus not limiting as to the types of memory usable for storage of a computer program.

In some embodiments, memory device 70 stores build parameters 31 including, without limitation, real-time and historical build parameter values, or any other type of data. Build parameters 31 include, for example, and without limitation, the power output, the vector scanning speed, the raster power output, the raster scanning speed, the raster tool path, and the contour power output of energy source 12. In alternative embodiments, memory device 70 stores any data that enable additive manufacturing system 10 to operate as described herein. In some embodiments, processor 72 removes or "purges" data from memory device 70 based on the age of the data. For example, processor 72 overwrites previously recorded and stored data associated with a subsequent time or event. In addition, or alternatively, processor 72 removes data that exceeds a predetermined time interval. In addition, memory device 70 includes, without limitation, sufficient data, algorithms, and commands to facilitate monitoring and measuring of build parameters 31 and the geometric conditions of the component fabricated by additive manufacturing system 10.

In some embodiments, controller 18 includes a presentation interface 74 coupled to processor 72. Presentation interface 74 presents information, such as images, to a user 76. In one embodiment, presentation interface 74 includes a display adapter (not shown) coupled to a display device (not shown), such as a cathode ray tube (CRT), a liquid crystal display (LCD), an organic LED (OLED) display, or an "electronic ink" display. In some embodiments, presentation interface 74 includes one or more display devices. In addition, or alternatively, presentation interface 74 includes an audio output device (not shown), for example, without limitation, an audio adapter or a speaker (not shown).

In some embodiments, controller 18 includes a user input interface 78. In the exemplary embodiment, user input interface 78 is coupled to processor 72 and receives input from the user. In some embodiments, user input interface 78 includes, for example, without limitation, a keyboard, a pointing device, a mouse, a stylus, a touch sensitive panel, such as, without limitation, a touch pad or a touch screen, and/or an audio input interface, such as, without limitation, a microphone. In further embodiments, a single component, such as a touch screen, functions as both a display device of presentation interface 74 and user input interface 78.

In the exemplary embodiment, a communication interface 80 is coupled to processor 72 and is coupled in communication with one or more other devices, such as material delivery system 24, and performs input and output operations with respect to such devices while performing as an input channel. For example, in some embodiments, communication interface 80 includes, without limitation, a wired network adapter, a wireless network adapter, a mobile telecommunications adapter, a serial communication adapter, or a parallel communication adapter. Communication interface 80 receives a data signal from or transmits a data signal to one or more remote devices.

Presentation interface 74 and communication interface 80 are both capable of providing information for use with the methods described herein, such as, providing information to user 76 and/or processor 72. Accordingly, presentation interface 74 and communication interface 80 are referred to as output devices. Similarly, user input interface 78 and communication interface 80 are capable of receiving information for use with the methods described herein and are referred to as input devices.

Figure 6:
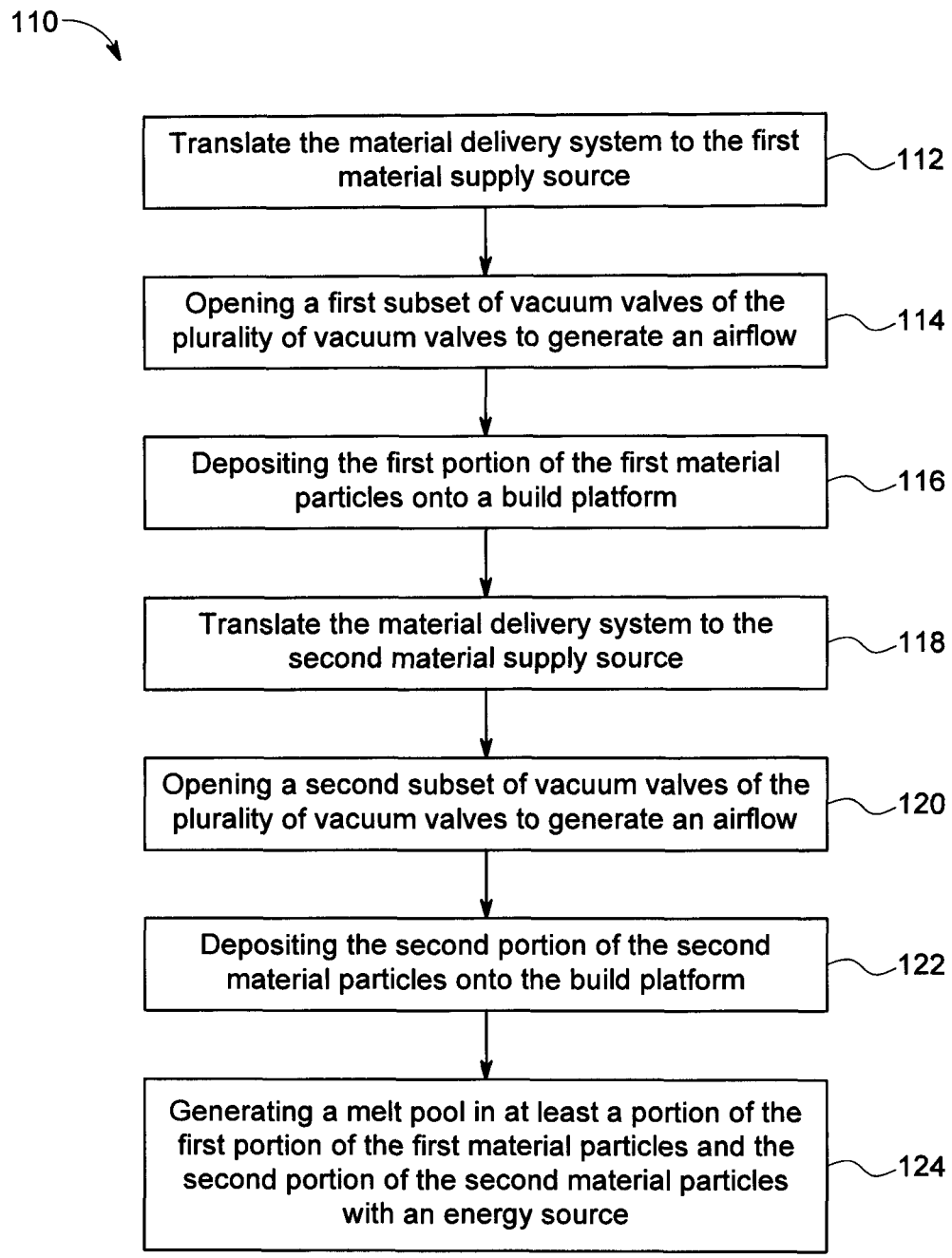
FIG. 6 is a flow chart of a method that may be implemented to fabricate a component using the additive manufacturing system shown in FIG. 1.

FIG. 6 is a flow chart of a method 110 that may be implemented to fabricate component 30 using additive manufacturing system 10 (shown in FIG. 1). With reference to FIGS. 1-5, in the exemplary embodiment, controller 18 translates 112 material delivery system 24 to first material supply source 54. As described herein, first material supply source 54 includes a quantity of first material particles 26. Material delivery system 24 includes the plurality of vacuum valves 38 and air permeable screen 40. Controller 18 actuates or opens 114 first subset 66 of the plurality of vacuum valves 38 to generate airflow through first subset 66 of vacuum valves 38 and air permeable screen 40 to entrain a first portion of first material particles 26 and engage the first portion of first material particles 26 against air permeable screen 40. The first portion of the first material particles 26 is deposited 116 onto build platform 22.

Furthermore, controller 18 translates 118 material delivery system 24 to second material supply source 56. As described herein, second material supply source 56 includes a quantity of second material particles 28. Controller 18 actuates or opens 120 second subset 68 of the plurality of vacuum valves 38 to generate the airflow through second subset 68 of vacuum valves 38 and air permeable screen 40 to entrain a second portion of second material particles 28 and engage the second portion of second material particles 28 against air permeable screen 40. The second portion of the second material particles 28 is deposited 122 onto build platform 22. In addition or alternatively, depositing 116 the first portion of first material particles 26 onto build platform 22 occurs simultaneously with the depositing 122 of the second portion of second material particles 28 onto build platform 22. A melt pool is generated 124 in at least one of a portion of the first portion of first material particles 26 or the second portion of second material particles 28 with energy source 12 to facilitate fabricating component 30. Additionally, method 110 may also include vibrating build platform 22 and screeding first material particles 26 or second material particles 28 between the steps of depositing 122 and generating 124.

In an alternative embodiment of method 110, controller 18 further translates material delivery system 24 to a sacrificial material supply source 58 having a plurality of sacrificial material particles 60. Controller 18 actuates or opens a third subset 69 of vacuum valves 38 of the plurality of vacuum valves 38 to generate the airflow through third subset 69 of vacuum valves 38 and air permeable screen 40. The airflow entrains a third portion of sacrificial material particles 60 and engages the third portion of sacrificial material particles 60 against air permeable screen 40. In such an embodiment, third subset 69 of vacuum valves 38 is different from first subset 66 of vacuum valves 38 and second subset 68 of vacuum valves 38. The third portion of sacrificial material particles 60 is deposited onto build platform 22.

In the exemplary embodiment, controller 18 deposits 116, 122 first material particles 26 and second material particles 28 onto build platform 22 by closing first subset 66 and second subset 68 of vacuum valves 38. Closing of vacuum valves 38 facilitates preventing the airflow through air permeable screen 40 and first subset 66 and second subset 68 of vacuum valves 38. When the airflow stops flowing through air permeable screen 40 and first subset 66 and second subset 68 of vacuum valves 38, first material particles 26 and second material particles 28 disengage from air permeable screen 40.

The above described systems and methods relate to additive manufacturing systems, such as Direct Metal Laser Melting (DMLM) systems. The embodiments described herein include a material delivery system that retrieves and deposits a plurality of first material particles and a plurality of second material particles onto a build platform. The material delivery system includes an array of vacuum valves that are individually controllable to facilitate retrieving select portions of first and second material particles. In further embodiments, a sacrificial material is retrieved and deposited onto the build platform between the first and second material particles to facilitate providing support to the component being fabricated. Accordingly, the described embodiments allow components to be fabricated having predetermined, localized material properties. For example, and without limitation, different material particles are included within the same component layer during a build of the component to facilitate localization of material properties within the component.

An exemplary technical effect of the methods and systems described herein includes at least one of: (a) fabricating components having predetermined, localized material properties; (b) reducing time and resources required fabricate components; (c) fabricating components including different material particles within the same build layer; and (d) providing a material delivery system for simultaneously depositing at least two different material particles onto a build platform.

Exemplary embodiments of additive manufacturing systems including a vacuum material delivery system are described above in detail. The systems and methods described herein are not limited to the specific embodiments described, but rather, components of systems and/or steps of the methods may be utilized independently and separately from other components and/or steps described herein. For example, the methods may also be used in combination with other laser fabrication systems magnetic bearing systems and methods, and are not limited to practice with only the systems and methods, as is described herein. Rather, the exemplary embodiments can be implemented and utilized in connection with many additive manufacturing system applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of fabricating a component using an additive manufacturing system, said method comprising:
    providing an additive manufacturing system comprising an energy source and a material delivery system comprising:
        a dispenser assembly comprising a plurality of vacuum valves and an air permeable screen; and
        a vacuum source coupled in fluid communication with said plurality of vacuum valves;
    entraining a first portion of first material particles in an airflow generated by the vacuum source and engaging the first portion of the first material particles against the air permeable screen;
    depositing the first portion of the first material particles onto a build platform by closing a first subset of vacuum valves of the plurality of vacuum valves to prevent airflow through the first subset of vacuum valves and the air permeable screen such that the first portion of the first material particles disengages from the air permeable screen;
    entraining a second portion of second material particles in the airflow and engaging the second portion of the second material particles against the air permeable screen;
    depositing the second portion of the second material particles onto the build platform by closing a second subset of vacuum valves of the plurality of vacuum valves to prevent airflow through the second subset of vacuum valves and the air permeable screen such that the second portion of the second material particles disengages from the air permeable screen; and
    transferring heat to at least a portion of at least one of the first portion of the first material particles or the second portion of the second material particles with an energy source to facilitate consolidating the first portion of the first material particles and the second portion of the second material particles to fabricate the component.

2. The method in accordance with claim 1, wherein entraining a first portion of first material particles in an airflow comprises opening the first subset of vacuum valves to generate the airflow through the first subset of vacuum valves and the air permeable screen.

3. The method in accordance with claim 2, wherein entraining a second portion of second material particles in the airflow comprises opening the second subset of vacuum valves to generate the airflow through the second subset of vacuum valves and the air permeable screen, wherein the second subset of vacuum valves is different from the first subset of vacuum valves.

4. The method in accordance with claim 1 further comprising translating a material delivery system to a first material supply source including the first material particles, the material delivery system including a plurality of vacuum valves and the air permeable screen.

5. The method in accordance with claim 4 further comprising translating the material delivery system to a second material supply source including the second material particles.

6. The method in accordance with claim 1, wherein depositing the first portion of the first material particles onto a build platform occurs simultaneously with the depositing the second portion of the second material particles onto the build platform.

7. The method in accordance with claim 1 further comprising translating a material delivery system to a sacrificial material supply source having a plurality of sacrificial material particles.

8. The method in accordance with claim 7 further comprising opening a third subset of vacuum valves to generate an airflow through the third subset of vacuum valves and the air permeable screen, the airflow entraining a third portion of the sacrificial material particles and engaging the third portion of the sacrificial material particles against the air permeable screen, wherein the third subset of vacuum valves is different from the first subset of vacuum valves and the second subset of vacuum valves.

9. The method in accordance with claim 8 further comprising depositing the third portion of the sacrificial material particles onto the build platform.

10. The method in accordance with claim 9, wherein depositing the third portion of the sacrificial material particles onto the build platform comprises closing the third subset of vacuum valves to prevent airflow through the third subset of vacuum valves and the air permeable screen such that the third portion of the sacrificial material particles disengage from the air permeable screen.

11. The method in accordance with claim 1, wherein transferring heat comprises transferring heat with the energy source based on one or more of the following: a power output, a vector scanning speed, a raster power output, a raster scanning speed, a raster tool path, and a contour power output of the energy source.

* * * * *